(12) United States Patent
Chen

(10) Patent No.: US 10,106,414 B2
(45) Date of Patent: Oct. 23, 2018

(54) MOLTEN IRON-ASSISTED METHOD FOR PRODUCING ALUMINUM NITRIDE AND DEVICE THEREOF

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 284 days.

(21) Appl. No.: 14/992,101

(22) Filed: Jan. 11, 2016

(65) Prior Publication Data

US 2017/0107110 A1 Apr. 20, 2017

(30) Foreign Application Priority Data

Oct. 14, 2015 (TW) .............................. 104133735 A

(51) Int. Cl.
*B01J 19/24* (2006.01)
*C01B 21/072* (2006.01)

(52) U.S. Cl.
CPC ........... *C01B 21/0722* (2013.01); *B01J 19/24* (2013.01)

(58) Field of Classification Search
None
See application file for complete search history.

(56) References Cited

PUBLICATIONS

Park et al.; Thermodynamics of AlN Formation in high Manganese-Aluminum Alloyed Liquid Steels; ISIJ International, vol. 53, No. 6, pp. 973-978.*

* cited by examiner

*Primary Examiner* — Guinever S Gregorio
(74) *Attorney, Agent, or Firm* — Locke Lord LLP; Tim Tingkang Xia, Esq.

(57) ABSTRACT

A molten iron-assisted method for producing aluminum nitride (AlN) and a device thereof are disclosed. Pure aluminum is introduced into a vacuumed molten iron bath continuously for producing a molten iron bath having the aluminum, then nitrogen is introduced into the molten iron bath having the aluminum. Production of AlN is controlled by having the concentration of aluminum in the molten iron bath having the aluminum controlled. At the time AlN is formed continuously in the molten iron bath having the aluminum, AlN floats to the surface of the molten iron bath having the aluminum. Ar and $N_2$ may be blown and dust is removed by static electrons thereafter, such that pure aluminum nitride powder can be collected. Finally, the used gas is recycled and reused.

2 Claims, 3 Drawing Sheets

MOLTEN IRON-ASSISTED METHOD FOR PRODUCING ALUMINUM NITRIDE AND DEVICE THEREOF

CROSS-REFERENCE TO RELATED APPLICATIONS

This non-provisional application claims priority under 35 U.S.C. § 119(a) on Patent Application No(s). 104133735 filed in Taiwan, R.O.C. on Oct. 14, 2015, the entire contents of which are hereby incorporated by reference.

BACKGROUND OF THE INVENTION

1. Field of the Invention

The disclosure is related to a molten iron-assisted method for producing aluminum nitride and a device thereof, and more particularly to a method for producing aluminum nitride and a device thereof having a rapid producing rate and simplified process.

2. Description of Related Art

Aluminum nitride has great thermal conductivity (theoretical value: 320 W/mK), great electrical insulation, a small coefficient thermal expansion (4.3 ppm/K, which is closed to silicon), great thermal shock resistance and great corrosion resistance. Thus, aluminum nitride has become an important material in the industry in recent years. Aluminum nitride has great potentials in a variety of applications of high technology industry, including electrical substrates, integrated circuit packaging materials, heat dissipating element in electric elements, composite materials with high thermal conductivity, containers for containing and treating melt salts or metals and so forth.

Currently, methods for producing aluminum nitride in the industry, such as carbon reductive nitridation of aluminum oxide powder (Tokuyama, Japan) and direct nitridation of aluminum powder (ART, US; H. C. Starck, German), have the following disadvantages: consume much power, slow producing rate, complicated processes, and high cost, rendering expensive the application aluminum nitride. Since aluminum nitride is expensive, the scale of market cannot grow significantly as what experts expected. Instead, it only grows by a small extent stably; however, people in the industry hold the view that if the price of aluminum nitride can be greatly reduced (for example, by 30%), the demand of aluminum nitride will significantly increase, and the market will grow significantly as expected.

Since the cost of producing aluminum nitride currently is high, the only way to greatly decrease the price of aluminum nitride is to develop a process with high quality and low cost; currently, main methods for producing aluminum nitride are carbon reductive nitridation of aluminum oxide powder and direct nitridation of aluminum, wherein the method of direct nitridation of aluminum has the problem of fusion of aluminum, aluminum with high purity cannot be obtain in one reaction, and numerous processes of grinding, re-reacting as well as operating under a high temperature for a long time are needed. Together, such methods could be extensively power-consuming.

In addition, aluminum with high purity can be obtained by the method of carbon reductive nitridation of aluminum oxide powder. However, the obtained product has too much amount of carbon, so that carbon has to be removed by oxidation under an atmosphere having oxygen, which would cause the increase of the amount of oxygen in the product. In addition, the method also needs to be performed under a high temperature for a long time, further contributing to extra power consumption.

Accordingly, there are no methods and devices having a fast producing rate and simple processes for producing aluminum nitride. Thus, it is important to develop a method for producing aluminum nitride which can increase the producing rate and yield, and can save power and cost so as to solve the problem that producing aluminum nitride is expensive.

SUMMARY OF THE INVENTION

The disclosure relates to a method for producing aluminum nitride and a device thereof associated with a rapid producing rate and simplified process.

The disclosure relates to a method for producing aluminum nitride and a device thereof which can increase the producing rate and yield of aluminum nitride, such that the power and cost of producing aluminum nitride can be saved. Therefore, the problem of expensive aluminum nitride prepared by the prior art can be solved.

According to an embodiment of the disclosure, a molten iron-assisted method for producing aluminum nitride is provided. The method may include:

(1) introducing pure aluminum into a pure molten iron bath in vacuum continuously;

(2) introducing controllable amount of nitrogen continuously so as to produce aluminum nitride in the pure molten iron bath in which the content of aluminum (0.1%-50%) is controlled, such that the problem of fusion of aluminum in direct nitridation can be overcome, aluminum with high purity can be obtained in a single reaction without the need of grinding and re-reacting while solving the problem of high consumption of power due to operating under a high temperature for a long time; since aluminum nitride is less dense than iron, aluminum nitride can float to the surface of the pure molten iron bath having aluminum continuously;

(3) afterwards, blowing gas and removing dust by static electrons for collecting aluminum nitride powder; and (4) finally, recycling and reusing the gas.

More specifically, the pure aluminum is pure aluminum powder or pure aluminum wires.

More specifically, the step of blowing the gas may include blowing the aluminum nitride floating on the surface of the pure molten iron bath having aluminum by the gas, and with the removal of the dust by the static electrons, the aluminum nitride powder can be produced.

More specifically, the gas is argon or other noble gases.

According to another embodiment of the disclosure, a device for producing aluminum nitride is provided. The device may include a pure molten iron bath vessel including a pure molten iron bath section, a feeding section and a collecting section. The pure molten iron bath section is configured for performing a melting process and forming a pure molten iron bath in the pure molten iron bath section, the feeding section is connected with a feeding inlet and a gas inlet and configured for introducing pure aluminum into the pure molten iron bath through the feeding inlet. The gas inlet is configured for introducing nitrogen to the feeding inlet, such that the aluminum and the iron in the pure molten iron bath react with the nitrogen to form aluminum nitride, and aluminum nitride powder floats on the surface of the pure molten iron bath continuously, the collecting section has at least one gas entering opening and at least one drawing opening. The collecting section may further include a first gas supplier connecting with the gas inlet of the feeding section and configured for providing nitrogen to the gas inlet, and a second gas supplier connecting with the gas entering opening of the collecting section for supplying gas to the collecting section and configured for blowing the aluminum nitride floating on the surface of the pure molten iron bath so as to form aluminum nitride powder. The collecting section may further include a dust collector connecting with the drawing opening and the second gas supplier and having a gas drawing device, a filter and a gas recycling device, with the filter disposed between the gas drawing device and the gas recycling device. After the gas drawing device collects the aluminum nitride powder from the drawing opening, the gas recycling device can draw and recycle the gas brought with the collected aluminum nitride powder, and the filter disposed between the gas drawing device and the gas recycling device can collect the aluminum nitride powder, and the gas drawn and recycled by the gas recycling device can be introduced into the second gas supplier again.

More specifically, the gas provided by the second gas supplier is argon or other noble gases.

More specifically, the gas recycling device of the dust collector is connected with the second gas supplier through a gas pipeline.

More specifically, a separator is disposed between the feeding section and the collecting section.

More specifically, the bottom of the pure molten iron bath section is an inclined surface.

More specifically, the bottom of the pure molten iron bath section is a flat surface.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF THE PREFERRED EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
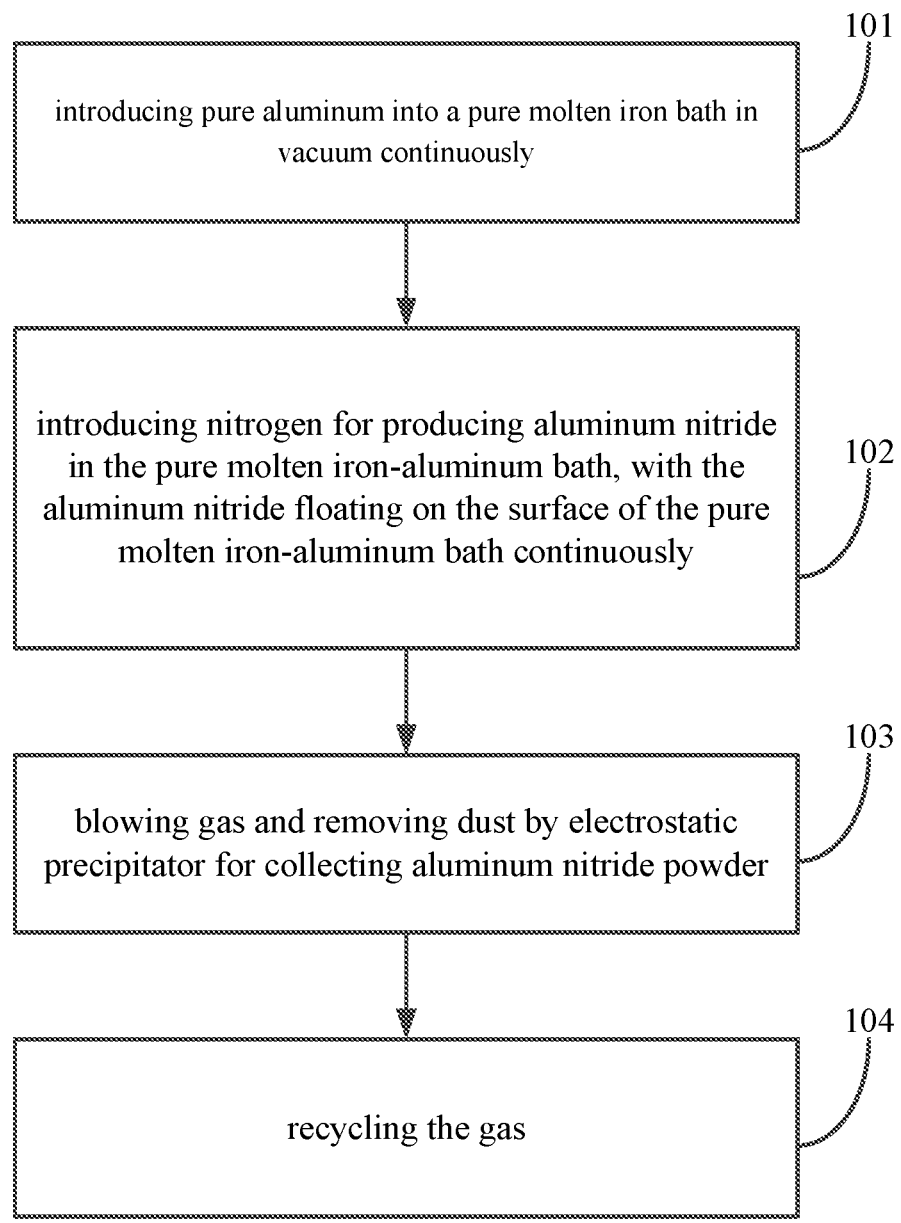
FIG. 1 is a flow chart of the molten iron-assisted method for producing aluminum nitride according to one embodiment of the disclosure.

Referring to FIG. 1, which is a flow chart of the molten iron-assisted method for producing aluminum nitride according to one embodiment of the disclosure. According to the figure, the method comprises the following steps:

(1) introducing pure aluminum into a pure molten iron bath in vacuum continuously (step 101);

(2) introducing nitrogen for producing aluminum nitride in the pure molten iron bath having aluminum, with the aluminum nitride floating on the surface of the pure molten iron bath having the aluminum continuously (step 102);

(3) blowing gas and removing dust by static electrons for collecting aluminum nitride powder (step 103); and (4) recycling the gas 104.

The method for producing aluminum nitride that could be simplified in process is developed from steelmaking processes of low carbon steel (such as IF steel). More specifically, since the contents of C and N are low, the introduction of a certain amount of oxygen and argon could render the carbon to be pre-dissolved in the low carbon steel solution, which will react with oxygen and form carbon monoxide, such that interstitial atoms (e.g., carbon and nitrogen) in the low carbon steel can be completely removed by the vacuum and argon, and clean ferritic steel without interstitial atoms (e.g., Interstitial Free Steel) can be obtained. Since RH-OB degassing process is adopted and key devices are reformed, IF steel with great quality is obtained, and the composition of current IF steel is substantially: $C \leq 0.005\%$, $N \leq 0.003\%$, Ti or Nb in general about 0.05%.

Interstitial atoms, such as carbon and nitrogen, play important roles to the texture, r value and aging of IF steel. The dissolved carbon and nitrogen will be unfavorable for the formation of texture and the r value will be significantly decreased. In addition, the increase of the content of carbon and nitrogen will significantly increase the tendency of age hardening of IF steel. It is more favorable for the development of texture, increasing r value, as well as ensuring non age hardening of IF steel by obtaining clean ferritic steel. Since nitrogen is harmful to steel, the content of nitrogen is generally controlled below 40 ppm, and the remaining aluminum after deoxidation can react with nitrogen and form stable AlN. Consequently, the nitrogen could be completely fixed.

Figure 2:
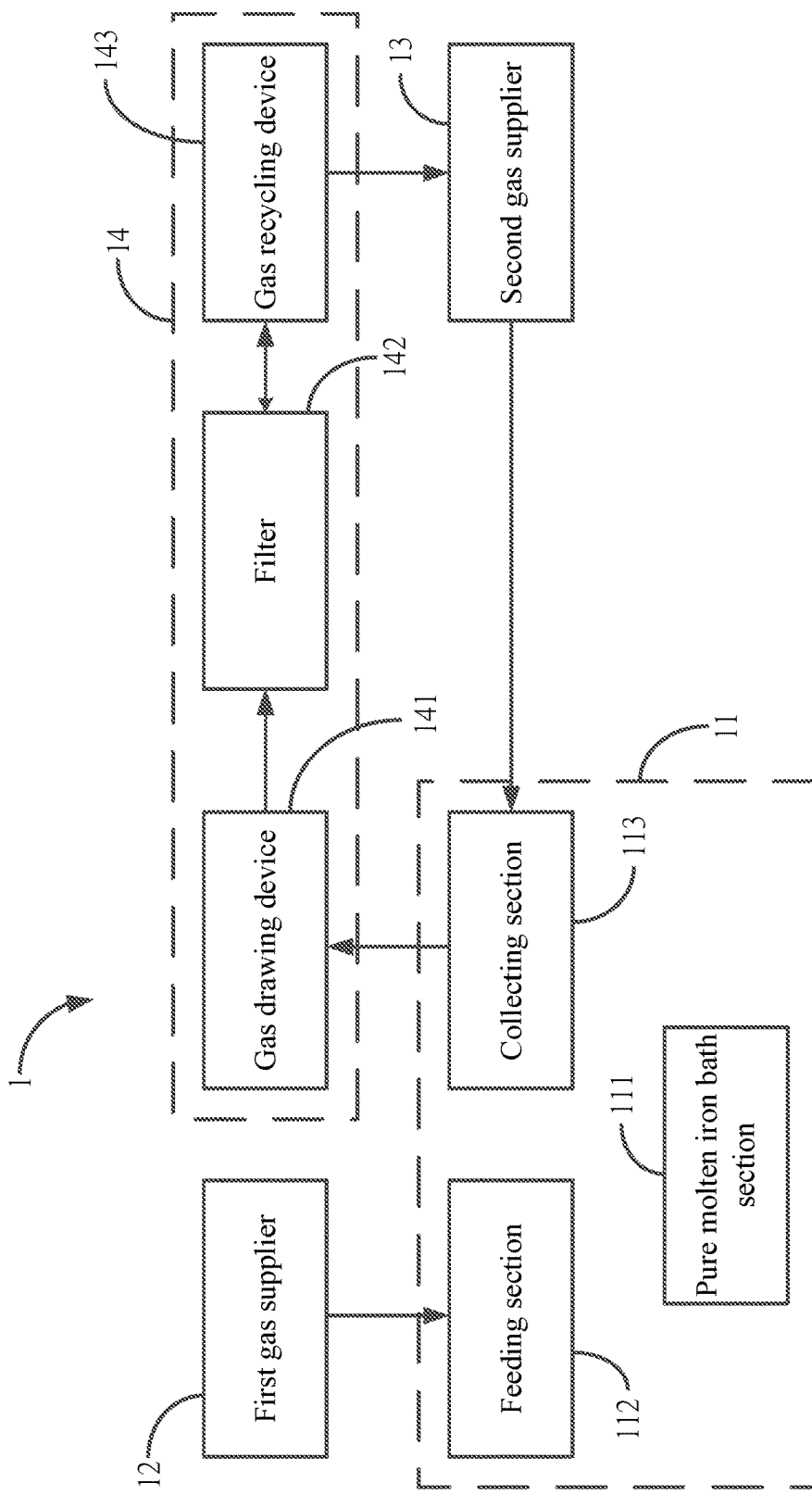
FIG. 2 is a schematic view of the device for producing aluminum nitride according to one embodiment of the disclosure.
Figure 3:
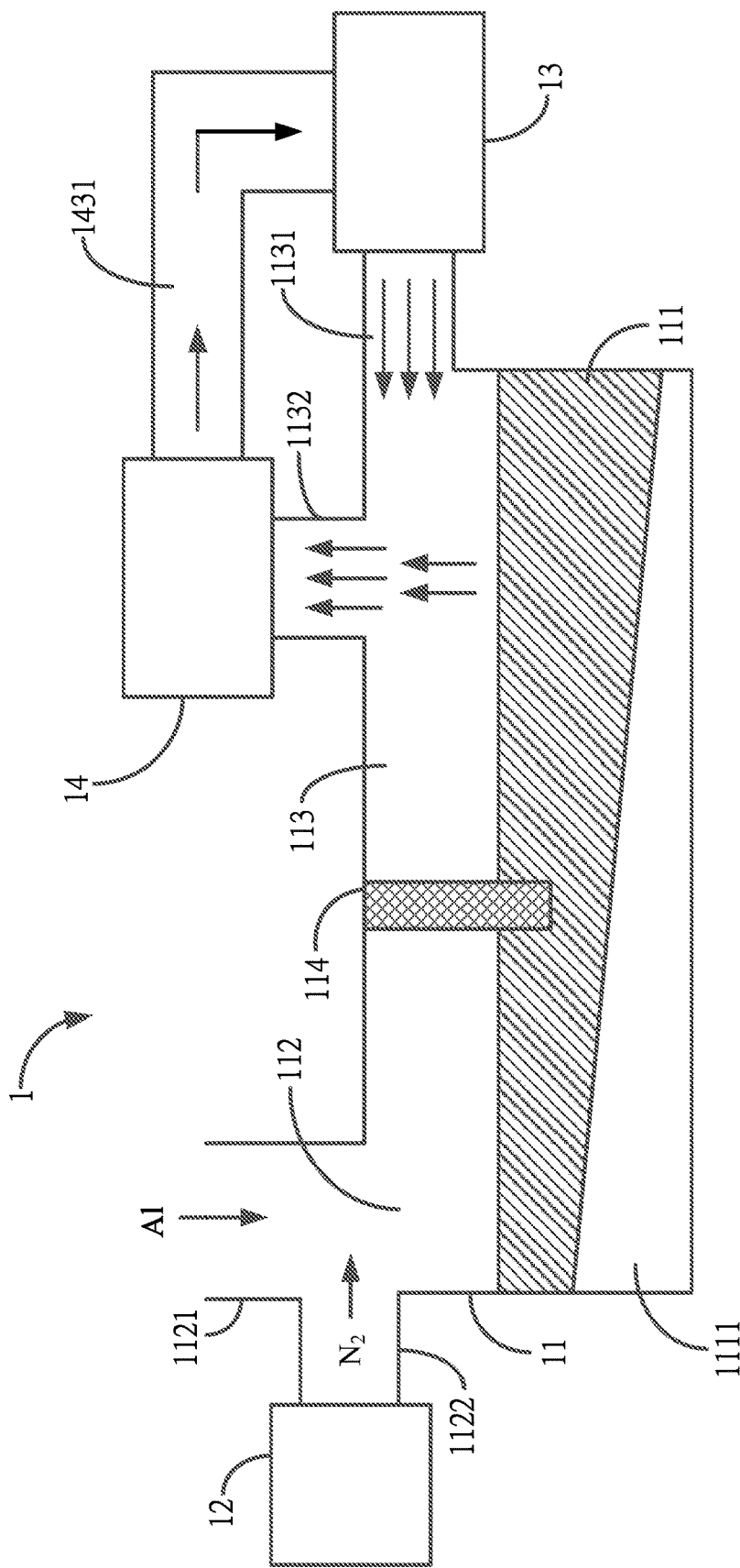
FIG. 3 is a schematic view of the device for producing aluminum nitride in operation according to one embodiment of the disclosure.

Accordingly, if the method is further applied in producing aluminum nitride, the producing rate will be faster and the process could be further simplified. Since the remaining aluminum after deoxidation will react with nitrogen in the process of preparing low carbon steel so as to lower the impact of nitrogen on the purity of IF steel. Thus, according to the disclosure, a device 1 is used for producing aluminum nitride. As shown in FIGS. 2 and 3, the device 1 operating in vacuum could include a pure molten iron bath vessel 11 (in this embodiment, it is made of $Al_2O_3$ and MgO, but in other embodiments, it can be made of other materials which do not react with the pure molten iron bath), a first gas supplier 12, a second gas supplier 13 and a dust collector 14. As shown in FIGS. 2 and 3, the pure molten iron bath vessel 11 may include a pure molten iron bath section 111, a feeding section 112 and a collecting section 113, the bottom of the pure molten iron bath section 111 has an inclined surface 1111 (alternatively, a flat surface having an inclined angel of 0 degree), and the pure molten iron bath section 111 is configured for performing a melting process and forming a pure molten iron bath in the pure molten iron bath section 111.

The feeding section 112 is connected with a feeding inlet 1121 and a gas inlet 1122 and configured for introducing pure aluminum (aluminum powder or aluminum powders) into the pure molten iron bath through the feeding inlet 1121 for forming pure molten iron bath having aluminum, after the first gas supplier 12, which is connected with the gas inlet 1122, introduces the nitrogen (alternatively, a small amount of argon can be added, $Ar+N_2$) to the feeding section 112. Since the pure aluminum will form a solution in the iron solution, the aluminum will be dissolved in the pure molten iron bath before the nitrogen is blown (such as being blown at the bottom) in order for the pure molten iron bath flow to be formed. As such, the aluminum in the pure molten iron bath can react with nitrogen. Aluminum will take precedence to react with nitrogen and form aluminum nitride (AlN), as compared with iron, since aluminum nitride is lighter than iron. When the amount of aluminum nitride in the pure molten iron bath having aluminum increases, the aluminum nitride will float on the surface of the pure molten iron bath having aluminum continuously.

In addition, according to Chase, M. W., Jr., NIST-JANAF Themochemical Tables, Fourth Edition, J. Phys. Chem. Ref. Data, Monograph 9, 1998, 1-1951, it is more likely to form aluminum nitride (−317.98 kJ/mol) without forming iron nitride (+2-+6.4 kJ/mol) when the heat of formation is more negative, and it is less likely to form aluminum nitride without forming iron nitride when the heat of formation is more positive.

In addition, the collecting section 113 has at least one gas entering opening 1131 and at least one drawing opening 1132, and a separator 114 is disposed between the feeding section 112 and the collecting section 113. Thus, when the second gas supplier 13 connected with the gas entering opening 1131 blows the gas to the collecting section 113 for blowing the aluminum nitride floating on the surface of the pure molten iron bath the separator 114 can centralize the gas blown by the second gas supplier 13 to the collecting section 113 for causing cyclone effect at the collecting section 113, and the aluminum nitride will be blown and form the aluminum nitride powder.

In addition, the feeding inlet 1131 and the gas entering opening 1122 may be disposed at the bottom of the pure molten iron bath vessel 11 for blowing a mixture of gas and aluminum powder at the bottom into the pure molten iron bath section 111, eliminating the need of the separator 114.

Afterwards, the dust collector 14 connected with the drawing opening 1132 and the second gas supplier 13 may collect the aluminum nitride powder. The dust collector 14 may include a gas drawing device 141, a filter 142 and a gas recycling device 143. The gas drawing device 141 may connect with the drawing opening 1132, the gas recycling device 143 may be connected with the second gas supplier 13 through a gas pipeline 1431, and the filter 142 may be disposed between the gas drawing device 141 and the gas recycling device 143. Therefore, after the gas drawing device 141 collects the aluminum nitride powder from the drawing opening 1132, the gas recycling device 143 is activated, such that the gas recycling device 143 draws and recycles the gas brought with the collected aluminum nitride powder. Meanwhile, the aluminum nitride powder may remain at the filter 142 allowing for the aluminum nitride powder to be collected. In addition, the gas drawn and recycled by the gas recycling device 143 is introduced into the second gas supplier 13 through the gas pipeline 1431.

According to the disclosure, compared with prior art, the molten iron-assisted method for producing aluminum nitride and the device thereof have the following advantages:

(1) the disclosed method for producing the aluminum nitride may control the concentration of the aluminum in the iron and the flow rate of the nitrogen, such that the nitrogen can react with the aluminum completely, and the producing rate and yield of the aluminum can increase.

(2) the method for producing the aluminum nitride of the disclosure can save the power and cost. Therefore, the problem in the prior art can be solved.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A molten iron-assisted method for producing aluminum nitride, comprising:
   introducing aluminum into a molten iron bath in vacuum continuously;
   introducing nitrogen to produce aluminum nitride powder in the molten iron bath having the aluminum with the aluminum nitride powder floating on the surface of the molten iron bath having the aluminum;
   blowing the aluminum nitride powder away from the surface of the molten iron bath having the aluminum by argon or other noble gases, and collecting the aluminum nitride powder with static electrons; and
   recycling argon or other noble gases.

2. The molten iron-assisted method for producing aluminum nitride according to claim 1, wherein the aluminum is aluminum powder or aluminum wires.

* * * * *